(12) United States Patent
Howell

(10) Patent No.: US 9,666,234 B2
(45) Date of Patent: May 30, 2017

(54) MOTION PICTURE PROCESSING SYSTEM

(71) Applicant: Windense Ltd., Glasgow (GB)

(72) Inventor: Michael Howell, Glasgow (GB)

(73) Assignee: Windense Ltd., Glasgow (GB)

( * ) Notice: Subject to any disclaimer, the term of this patent is extended or adjusted under 35 U.S.C. 154(b) by 0 days.

(21) Appl. No.: 14/762,893

(22) PCT Filed: Jan. 24, 2014

(86) PCT No.: PCT/GB2014/050192
§ 371 (c)(1),
(2) Date: Jul. 23, 2015

(87) PCT Pub. No.: WO2014/118514
PCT Pub. Date: Aug. 7, 2014

(65) Prior Publication Data
US 2015/0357000 A1 Dec. 10, 2015

(30) Foreign Application Priority Data

Jan. 30, 2013 (GB) .................................. 1301633.2
Jun. 19, 2013 (GB) .................................. 1310951.7

(51) Int. Cl.
*G11B 27/34* (2006.01)
*G11B 27/00* (2006.01)
*H04N 5/253* (2006.01)
*H04N 9/11* (2006.01)

(52) U.S. Cl.
CPC ............ *G11B 27/34* (2013.01); *G11B 27/002* (2013.01); *H04N 5/253* (2013.01); *H04N 9/11* (2013.01); *H04N 2201/0404* (2013.01)

(58) Field of Classification Search
None
See application file for complete search history.

(56) References Cited

U.S. PATENT DOCUMENTS

| 2005/0289264 A1* | 12/2005 | Illowsky ............... G06F 1/3203 710/104 |
| 2007/0037102 A1* | 2/2007 | Mowry .................... G03C 7/22 430/495.1 |
| 2008/0112056 A1* | 5/2008 | Raymond ............ G02B 3/0025 359/619 |
| 2008/0198925 A1 | 8/2008 | Sayre |
| 2013/0021346 A1* | 1/2013 | Terman .................... G09B 5/08 345/467 |

(Continued)

FOREIGN PATENT DOCUMENTS

WO 0217617 A1 2/2002

*Primary Examiner* — Eileen Adams
(74) *Attorney, Agent, or Firm* — Wright IP & International Law; Eric G. Wright

(57) ABSTRACT

Described herein is a processing apparatus, film scanner and associated method, such as a processing apparatus for processing motion picture film, comprising an identification module for identifying selected regions of one or more digital images or digital video clips of the film; and an image modification module configured to access or produce data; and modify at least one of the one or more digital images or the digital video clip so as to provide the data in at least one of the selected regions. Advantageously, the selected regions correspond to perforations in the film.

15 Claims, 6 Drawing Sheets

(56) References Cited

U.S. PATENT DOCUMENTS

2013/0052594 A1* 2/2013 Carroll-Yacoby ... G03C 7/3041
430/363
2014/0161412 A1* 6/2014 Chase ................ H04N 21/2743
386/224

* cited by examiner

MOTION PICTURE PROCESSING SYSTEM

CROSS-REFERENCE TO RELATED APPLICATIONS

This application is a US National Stage Entry of PCT/GB2014/050192 which is entitled "Motion Picture Processing System" and which was filed on Jan. 24, 2013. PCT/GB2014/050192 claims benefit of foreign priority to GB 1301633.2 which was filed on Jan. 30, 2013, which is entitled "Motion Picture Processing System" and also claims benefit of foreign priority to GB 1310951.7 which was filed on Jun. 19, 2013, which is entitled "Motion Picture Processing System" and to each of which benefit of priority is claimed by this application. This application claims the benefit of foreign priority to each of GB 1301633.2 which was filed on Jan. 30, 2013 and GB 1310951.7 which was filed on Jun. 19, 2013 through PCT/GB2014/050192 filed on Jan. 24, 2013.

CROSS-REFERENCE TO RELATED APPLICATIONS

This patent application incorporates by reference in its entirety copending PCT Application No. PCT/GB2014/050192 which is entitled "Motion Picture Processing System" and which was filed on Jan. 24, 2013, which incorporates by reference in its entirety GB 1301633.2 which was filed on Jan. 30, 2013, which is entitled "Motion Picture Processing System" and PCT/GB2014/050192 also incorporates by reference in its entirety GB 1310951.7 which was filed on Jun. 19, 2013, which is entitled "Motion Picture Processing System". Each of GB 1301633.2 which was filed on Jan. 30, 2013, and GB 1310951.7 which was filed on Jun. 19, 2013, are incorporated herein in their entirety.

FIELD OF INVENTION

The present invention relates to a method and apparatus for scanning film such as motion picture film and other photographic film.

BACKGROUND

A great part of our cultural heritage is stored on motion picture film and other photographic based films. However, these films can deteriorate over time. Apparatus, such as that described in PCT/GB2012/052564, can be used to identify and/or assess the rate of deterioration of such films and record the images contained thereon and/or accurately convert such images to other mediums in order to preserve them by digitizing the films.

In addition, alternative motion picture scanners are available that comprise a light source, an optical line sensor (such as a CCD or CMOS based sensor), a mechanism for moving the film through the image collection area of the line sensor and means for connecting the sensor to a processing system, typically a suitably programmed computer.

In addition to the above considerations, in many industries, such as the motion picture film business, much effort goes into maximising the usable storage of a film. For example, frames of a motion picture film may comprise an image area, an area for an analogue soundtrack and an area for a digital soundtrack. In some examples, the analogue soundtrack can be provided between the image area and one of the sets of perforations of the film that extend along each side of the film and receive the sprockets of a sprocket driven film transport system. In some example, the digital soundtrack can be provided between individual perforations.

An object of the present invention is to address or mitigate at least one problem with the prior art.

SUMMARY OF INVENTION

According to a first aspect of the present invention is a method of producing or modifying a digital image or digital video clip of at least part of a film, the method comprising:
   accessing or producing data;
   identifying selected regions of one or more digital images or digital video clips of the film; and
   modifying at least one of the one or more digital images or digital video clips so as to provide or encode the data in the at least one of the selected regions.

The selected regions may correspond to, e.g. be comprised in, one or more blank regions of the digital images or digital video clips. Advantageously and beneficially, the selected regions may correspond to perforations in the film. The perforations in the film are usually regular, well defined, easily identified and inherently blank in a scanned image and are provided alongside each frame of the film. As such, providing the data in these regions of the digital images or digital video clips allows for easier processing and storage of data, a large total data storage area, and lack of conflict with the images of the film or other data.

In alternative or additional embodiments, the selected regions may be at a top or above, bottom or below or at or to side of one or more frames of the film and/or provided in a blanked box imposed on the image, for example.

The data may comprise digital or digitised data. The data may comprise digitally encoded or encrypted data.

The one or more digital images or digital video clips may be representative of images and/or data stored on or with one or more frames of the film. For example, the one or more digital images or digital video clips may be representative of the images in one or more frames of the film, and/or one or more soundtracks of the film and/or subtitle data and/or control data for controlling parameters of the apparatus for playing the film and/or calibration data or test patterns and/or data associated with an owner or creator of the film, and the like.

The data may comprise processed data derived from the film, for example, from the one or more digital images or digital video clips. The method may comprise processing the one or more digital images or digital video clips to produce the processed data. The processing may comprise post-scan processing. The processing may comprise automated and/or manual processing. The processed data may comprise or be representative of enhanced, error corrected or otherwise varied digital images or digital video clips. For example, the processed data may comprise or be representative of one or more error-corrected, digitally enhanced or otherwise varied images and/or soundtracks and/or video clips.

The processed data may comprise data for forming processed images and/or soundtracks and/or video clips from the original or other images and/or soundtracks and/or video clips. For example, the processed data may represent a full range exposure version of the original digital image or digital video, wherein the minimum exposure values of the pixels of the digital image(s) or digital video clip are set as zero or the minimum exposure value and the highest exposure values of the pixels are stretched to a maximum exposure value (e.g. 255) and the intervening exposure values are scaled accordingly, i.e. the exposure values are stretched between the maximum and minimum values.

However, the actual full range exposure images need not be stored. For example, conversion data, such as a look up table or the like, that converts the original digital image(s) or digital video (in this example, data that converts the exposure values of the digital image or digital video clip) into the processed data may be digitally encoded and stored in the selected area.

In this way, enhanced or error corrected film images and/or digitally enhanced images, soundtracks and the like may be stored within the digital images or video clips representing the original frames of the film. In this way, both the original frames of the film and the enhanced version may be stored and viewed. As such, the original version is stored, e.g. for historical interest, or to allow better processing techniques not available at the time of original processing to be applied at a later date, or to permit comparison between the enhanced and original versions of the film to determine processing errors and anomalies, or the like.

Alternatively or additionally, a plurality of enhanced, error corrected or otherwise varied digital images or digital video clips may be encoded in the selected areas. For example, various versions of a movie may be digitally encoded and stored in the selected areas. The various versions may correspond, for example, to various restorations or digital enhancements of the movie, e.g. using different enhancement or restoration techniques. In this way, a viewer such as an archivist can view the original film and/or various restorations or enhanced versions from the same source data, i.e. the series of digital images or digital video clip. In another example, the selected areas may be used to store digitally encoded versions of edited images, film clips, soundtracks or other material. In this way, information regarding the making of the film and/or alternative scenarios that were considered may be stored within the digital images or digital video clip. For example, the data may comprise an edit list or an enhancement or restoration list that lists and identifies stored enhanced or modified versions or edited sections and the like. In this way, the viewer can reconstruct the movie using the edited sections of their choosing and/or view their preferred enhanced, modified or restore version from the same series of digital images or digital video clip. This ability to view alternative or earlier versions of a movie within a single set of digital images or a digital video may be particularly beneficial for film archivists or film enthusiasts.

The digital data may comprise or be representative of at least one and preferably a plurality of soundtracks and/or subtitles, such as soundtracks and/or subtitles in a plurality of languages. The digital data may comprise soundtrack data that has been translated into one or more different languages. The digital data may comprise or be representative of commentary, audio annotations, descriptive versions of the soundtrack for the visually impaired and/or the like.

The digital data may comprise or represent additional digitally encoded images. The additional digitally encoded images may comprise images from a mini-feature, advertising, and/or the like.

The digital data may comprise or be representative of links to external data, such as network addresses, hyperlinks, and/or the like.

The digital data may comprise or be representative of data associated with the scanning process such as a reference identifying the scan, an identity or reference of the entity that scanned the film, a date the film was scanned on, parameters of the scanning process and/or the like.

The digital data may comprise indexing, cross referencing and/or other information associated with the film or a scene represented in one or more frames of the film. Examples of suitable indexing, cross reference and/or other information include film type, scene type, actors, content specific types, geography, history and/or the like.

The digital data may comprise encryption seeds or keys, for example, for accessing other portions of the digital data.

The method may comprise receiving the one or more digital images or digital video clips. The one or more digital images or digital video clips may comprise digitized images or video clips. The method may comprise scanning one or more films using a digital imaging device such as a scanner or digital camera in order to generate the one or more digitized images or digitized video clips.

It will be appreciated that the film may comprise a filmstrip such as those used in motion picture recording and display.

The data may comprise or be represented by an image, text, 2D or 3D barcodes or other suitable mechanisms for encoding or displaying data.

The data may comprise system or operation data or parameters such as at least one of an embedded test pattern, resolution, colour space and/or the like. Such data may be usable to calibrate display systems that display the one or more digital images and/or the digital video clip, advantageously "on the fly". Such data may, for example, be used to set at least one display property of the display system. Such data may also be usable to check degradation of other data storage mechanisms of the film, such as the image area, analogue soundtrack or digital soundtrack.

The data may comprise identification data, information, or other data such as at least one of copyright information, branding information, and/or the like.

The data may comprise information associated with other frames of the film such as preceding or following frames. Such information may, for example, be usable to check for deterioration of the film and/or assist restoration of degraded films.

The method may comprise or be comprised in a method for digitally scanning a film.

The method may comprise or be comprised in a method for modifying pre-scanned or digitized images or digitized video clips.

The method for digitally scanning a film may comprise imaging at least a portion of the film using at least one imaging device, such as a SLR camera, changing at least a part of the image of the portion of the film imaged by the imaging device(s) and imaging at least another portion of the film.

The method may comprise compositing, combining or merging images of at least one, e.g. two or more, portions of the film. The method may comprise forming a digital movie or video (e.g. the video clip) from one or more of the images, and/or one or more composite images, of one or more portions of the film.

The compositing, combining or merging of images and/or the forming of the digital movie or video and/or the modifying of the at least one of the one or more digital images or digital video clips may be performed on a processing device, which may comprise one or more computers. The processing device may comprise at least one processing unit. Each processing unit may comprise a plurality of processing cores or modules, e.g. at least four processing cores or modules, preferably at least six processing cores or modules and most preferably at least eight processing cores or modules. The processing cores may comprise logical cores.

The method may comprise running multiple instances of a compositing and/or modifying program for compositing, combining or merging images of portions of one or more films or modifying at least portions of the one or more films. The method may comprise allocating individual compositing and/or modifying programs to different processing cores or modules, e.g. at least one or each compositing program may be allocated to a different processing core or module to at least one or each other compositing program.

In this way, it may be possible to greatly increase the system throughput.

The method may comprise imaging or scanning a film, e.g. a reel of film. The method may comprise scanning the reel back to front, e.g. in a reverse direction such as in a direction from the last frame to the first frame. The method may comprise flipping the images and/or composited, combined or merged images, e.g. In the vertical axis of the images. The method may comprise reversing the numbering or ordering of the images or frames or the composited, combined or merged images.

In this way, it may be possible to digitally rewind the film, which may remove the need for a film rewind operation. This may be advantageous, for example, in applications in which old, valuable or fragile films are being scanned.

The scanning process may comprise at least one feature described in PCT/GB2012/052564, in the name of the present applicant, which is hereby incorporated by reference in its entirety.

Each portion of the film may comprise a frame of film or preferably a part of a frame of the film.

The method may comprise imaging the film using a processing apparatus or film scanner according to the second aspect.

According to a second aspect of the present invention is processing apparatus for processing digital images and/or digital video clips, the processing apparatus comprising:
 an identification module for identifying selected regions of one or more digital images or digital video clips of the film; and
 an image modification module configured to access or produce data; and modify at least one of the one or more digital images or the digital video clip so as to provide the data in at least one of the selected regions.

The selected regions may correspond to, e.g. be comprised in, one or more blank regions of the digital images or digital video clips. Advantageously and beneficially, the selected regions may correspond to perforations in the film. The perforations in the film are usually regular, well defined, easily identified and inherently blank in a scanned image and are provided alongside each frame of the film. As such, providing the data in these regions of the digital images or digital video clips allows for easier processing and storage of data, a high degree of data storage area, and lack of conflict with the image or other data.

The data may comprise digital or digitised data. The digital data may comprise digitally encoded or encrypted data.

The one or more digital images or digital video clips may be representative of images and/or data stored on or with one or more frames of the film. For example, the one or more digital images or digital video clips may be representative of the images in one or more frames of the film, and/or one or more soundtracks of the film and/or subtitle data and/or control data for controlling parameters of the apparatus for playing the film and/or calibration data or test patterns and/or data associated with an owner or creator of the film, and the like.

The digital data may comprise processed data derived from the film, for example, from the one or more digital images or digital video clips. The apparatus may be configured to process the one or more digital images or digital video clips to produce the processed data. The processing may comprise post-scan processing. The processing may comprise automated and/or manual processing. The processed data may comprise or be representative of enhanced, error corrected or otherwise varied digital images or digital video clips. For example, the processed data may comprise or be representative of one or more digitally enhanced images and/or soundtracks.

In this way, enhanced or error corrected film images and/or digitally enhanced film images, film soundtracks and the like may be stored within the digital images or video clips representing the original frames of the film without modifying any information contained in the original film frame.

In this way, both the original frames of the film and the enhanced version may be stored and/or viewed. As such, the original version is stored, e.g. for historical interest, or to allow better processing techniques not available at the time of original processing to be applied at a later date, or to permit comparison between the enhanced and original versions of the film to determine processing errors and anomalies, or the like.

The digital data may comprise or be representative of at least one and preferably a plurality of soundtracks and/or subtitles, such as soundtracks and/or subtitles in a plurality of languages. The digital data may comprise soundtrack data that has been translated into one or more different languages. The digital data may comprise or be representative of commentary, audio annotations, descriptive versions of the soundtrack for the visually impaired and/or the like.

The digital data may comprise or represent additional digitally encoded images. The additional digitally encoded images may comprise images from a mini-feature, advertising, and/or the like.

The digital data may comprise or be representative of links to external data, such as network addresses, hyperlinks, and/or the like.

The digital data may comprise or be representative of data associated with the scanning process such as a reference identifying the scan, an identity or reference of the entity that scanned the film, a date the film was scanned on, parameters of the scanning process and/or the like.

The digital data may comprise indexing, cross referencing and/or other information associated with the film or a scene represented in one or more frames of the film. Examples of suitable indexing, cross reference and/or other information include film type, scene type, actors, content specific types, geography, history and/or the like.

The digital data may comprise encryption seeds or keys, for example, for accessing the digital data.

The processing apparatus may comprise a communications unit for receiving the one or more digital images or digital video clips, for example, from a scanner or a database, data store, memory or other storage device.

The processing apparatus may comprise a digital imaging device for scanning the one or more films, such as a scanner or digital camera, in order to generate the one or more digital images or digital video clips.

The processing apparatus may be configured to implement a method according to the first aspect.

The processing apparatus may comprise or be comprised in a film scanner.

The film scanner may comprise: one or more imaging devices configured to collect an image of an imaging area; and a transit system for producing relative motion of the film and the imaging device.

Advantageously, at least one of the imaging devices may comprise a digital single lens reflex (SLR) camera.

The imaging device may be releasably mounted or mountable to the film scanner.

The transit system may comprise film handling apparatus for moving film through the imaging area of at least one of the one or more imaging devices.

The transit system may comprise apparatus for moving and/or reorienting the film relative to the imaging device, for example to change a portion of the film imaged by the imaging device. For example, the transit system may be configured to advance and/or rewind the film. In an optional embodiment, the transit system may be configured to pause the film whilst the image(s) of a corresponding portion of the film are taken by the imaging device(s) and then advance the film again. Preferably, the transit system may be configured to continuously move the film, which may be in combination with the imaging device being used in still/single picture mode and/or movie mode.

The transit system may comprise a sprocketless transit system, e.g. a system that does not comprise sprockets that engage with perforations in the film in order to advance or rewind the film. The transit system may comprise smooth rollers and preferably only uses smooth rollers to wind/unwind system, for example, comprising a film rewind system. At least one of the rollers may comprise a dust collection roller.

The triggering of the imaging devices to collect the image(s) may be by activating a remote trigger input of the imaging device. The one or more imaging devices may be configured to make one exposure or several exposures, for example, to take advantage of automatic exposure bracketing (AEB) mode.

The film scanner may be configured such that video recording by the one or more imaging devices may be started and/or stopped, for example, by using a standard remote camera trigger. The video recording may be started and/or stopped after a specified or set time period, for example by providing a timer or similar timing device. This may, for example, enable the film scanner to overcome a size and/or duration limit on collected video, e.g. associated with the imaging device.

Optionally, the film scanner may be configured to use multiple imaging devices and/or film runs through the film scanner, wherein each imaging device and/or run may have a different exposure setting, for example, to allow AEB to be applied.

The scanner may comprise a detector for detecting perforations in the film, such as an IR detector or light gate. The imaging device may be configured to collect images and/or select an image capture or collection rate based on the output of the perforation detection device.

In this way, the imaging devices of the film scanner may be straightforwardly replaced, renewed and updated as new technology becomes available. Furthermore, it facilitates the use of "off-the shelf" imaging devices, such as digital cameras. In addition, the resolution of the system can be altered by simply switching the cameras used by the system.

The film scanner may comprise at least one macro lens or interchangeable lens system. The macro lens and/or interchangeable lens system may be comprised in or attachable to each imaging device. The macro lens or interchangeable lens system may be provided or providable between each imaging device and the imaging area of the associated imaging device. The imaging device and/or film scanner may comprise at least one lens system for configuring the size of the imaging area, such as an extension tube. The lens system and/or macro lens and/or the at least one imaging device may be positioned and/or configured so that the imaging area is less or greater than the size of a frame of the film. For example, the film scanner may be configurable to image films of differing scan widths, e.g. by interchanging or reconfiguring the macro lens and/or extension tube.

The film scanner may comprise at least one light source, such as an LED based light source, which have been found to provide a suitably stable light source. The light source may comprise a non-strobed light source.

The film scanner may comprise or be connectable to a processing system. The processing system may be configured to selectively control and/or activate the at least one imaging device and/or receive images from the at least one imaging device and/or control the film handling apparatus to thereby control the position of the film relative to the at least one imaging areas of the at least one imaging device and/or control the at least one light source to control the illumination of the film and/or imaging areas.

The at least one imaging device may comprise a full frame sensor, e.g. comprising a plurality or rows and columns of imaging sensor devices and/or configured to take an image that extends in two dimensions in a single exposure or comprises a plurality of pixels extending in two orthogonal dimensions.

The imaging device may be arranged or arrangeable to image a portion of a frame of a film. The film scanner may be configured to move the film through the imaging area by less than a frame of the film at a time between collecting images using the at least one imaging device.

The film scanner may comprise a plurality of imaging devices and/or a plurality of light sources. Preferably each imaging device may be provided with a corresponding light source. The plurality of light sources and/or imaging devices may be multiplexed. Each imaging device may be configured to take an image of a different portion of the film and/or have a different imaging area. Optionally the imaging area of at least one imaging device may at least partially overlap with the imaging area of at least one other imaging device.

The processing system may be configured to merge, composite or combine a plurality of images taken by the one or more imaging devices. For example, the processing system may be configured to combine or merge images of two or more portions of the film or a frame of the film, taken by the same (or different) imaging device (s), wherein the film and/or imaging device was moved between collection of at least two of the images such that each image represents a different area of the film portion or frame. In another example, a plurality of imaging devices may be used to take images of differing sections of a frame or portion of the film and the processing system may be operable to merge or combine the images from each imaging device in order to generate a merged, combined or composite image. In another example, the film scanner may be configured such that the imaging areas of at least two imaging devices at least partially and optionally entirely overlap or and/an imaging device may be configured to collect multiple images of the same portion of film, and the multiple/overlapping images may be combined, merged or composited. As another example, a single imaging device may be used to collect and image of a portion of each frame, the transit system may then be configured to rewind the film and the imaging device repositioned and/or reoriented to collect another portion of each frame so as to collect each portion of each frame that the user wishes to scan.

The film scanner may be configured such that image capture/film scanning is separable from image processing such as frame compositing or re-compositing, for example, so that films may be processed at a later time or date and/or a different location to that in which they are scanned.

The film scanner may be configured to oversample or overscan at least one, preferably a plurality and most preferably each frame of the film. The oversampling or overscanning may comprise collecting multiple images and/or extended video footage of the frame(s) of the film. The processing system may be configured to convert video collected by the imaging device(s) into a plurality of still images.

The processing system may be configured to identify at least one image portion of at least one frame in each image and match the identified image portions of the at least one frame to corresponding image portions of the at least one frame identified in other images. The processing system may be configured to construct at least one reconstituted image of the at least one frame by forming a composite image comprising image portions of the at least one frames identified and extracted from at least one and preferably a plurality of images collected using the one or more imaging devices. The processing system is configured to detect and correct for defects in the composite image(s) and/or in image portions, for example the corrections may be for skew and/or frame jitter. The correction may comprise dynamic detection and/or correction. The processing system may be configured to reject any matched image portion in an image if some property of the determined image portion exhibits a difference from an expected value above a threshold.

The matching of frame portions may comprise filtering for noise and/or compensating for variations in light by position, area and/or time, which may comprise at least one of providing a template, correction or set-up data, performing background measurements or using statistical analysis.

The processing system may be configured to determine the frame advance speed of the film, for example, using images and/or video taken by the imaging device.

The processing system may be configured to determine the position of one or more indicative portions associated with at least one frame in two or more images, which may comprise identifying and/or matching the indicative portions associated with the at least one frame over two or more images. The processing system may be configured to use the determined relative position of the one or more indicative portions associated with at least one frame over two or more images in order to match portions of the frame and/or to determine the frame advance speed of the film and/or skew, jitter or other optical defects.

The processing system may be configured to determine or select the one or more indicative portions by determining portions of the frame having a high or highest contrast, e.g. a contrast above a threshold, and/or having the highest sensitivity to movement.

The image portions and/or indicative portions may comprise portions of the frame, for example, a plurality of pixels and/or one or more lines of the frame. The Indicative portions of the image associated with the frame may comprise at least part of the soundtrack associated with the frame, which may comprise an analogue and/or a digital soundtrack. The indicative portions of the image associated with a frame may comprise indicia or other suitable markings, which may be periodically spaced and/or repeatable indicia or markings.

The indicative portions of the image associated with a frame may comprise images of the perforations in the film.

The processing system may be configured to estimate a position of the at least one image portion or at least one indicative portion of the at least one frame in an image using an estimated or predicted position based on a determined position of the at least one image or indicative portion in at least one previous image and an estimated or currently calculated frame advance speed of the film or a frame advance speed of the film determined by other means. Examples of other means may include at least one of an IR detector or light gate configured to detect perforations in the film, detections of locations of perforations in the at least one images, detections of frame lines (spacing between frame of the films), detection of features associated with the soundtrack of the film and/or detection of indicia or other markings of the film, which may be periodically disposed.

The processing system may be configured to construct a map of indicative portions and use the map to determine a frame advance speed and/or estimated location of the at least one image portion and/or skew errors in or between images and/or determine an optimum level of image exposure.

The processing system may be configured to look for, or begin processing of an image to identify, the at least one image or indicative portions of the frame at, or in a selected area based on, the estimated position(s) of the one or more image or indicative portions of the frame. The selected area may be sized depending on a determined variation in frame advance speed, e.g. by a region of feasibility. The selected area may be increased in size if no close match (e.g. within a predetermined threshold) to the at least one image or indicative portion is found.

When looking for the image and/or indicative portions in an image, the processing system may be configured to use non-linear interpolation to magnify one or more areas of the at least one image.

The film scanner may be configured to dynamically detect image area size and centre within frames and may be configured to compensate for frame to frame jitter, e.g. by using the determined detected image area size and centre. For example, the processing system may be configured to determine a centre of an image portion (e.g. In an image line or in a plurality of image lines) or a frame and use this to ensure that the image portions or frames are correctly aligned in the reconstituted image(s). In another example, variations in the relative locations of the indicative portions can be used to detect and correct for optical defects such as skew and jitter. The processing system may be configured to construct the reconstituted image(s) using the determined frame advance speed associated with each image portion and/or frame and/or image. In that way, distortions in the reconstituted frame images due to variations in the frame advance speed due to loose tolerances in the transport system may be minimised. This may allow the use of less sophisticated and/or cheaper transport systems.

The film scanner may be configured to tag or otherwise package the images such that the images can be processed using distributed, modular and/or batch processing. The film scanner may comprise and/or be connectable to and/or be configured to provide images to a plurality of processing systems. Each processing system may be configured to process some but less than all of the images collected using the imaging devices, which may be temporally sequential images, in order to reconstitute part of the contents of the film. At least one of the processing systems may be configured to assemble the parts of the contents of the film generated by each of the plurality of processing systems in order to form a reconstructed movie.

The film scanner may be configured to determine perforation gap in the film from visual images, for example, to compute shrinkage of the film, which may comprise continuous determination of perforation gap.

The film scanner may be configured for use at variable resolution. The resolution of the scanner may be variable by interchanging at least one of the imaging devices.

Using the above, the resulting composite image may have an effective resolution higher than that achievable than that available using any of the imaging devices alone.

The film scanner may be configured to scan a soundtrack embedded on the film. The film scanner may be configured to capture image and sound on the same scan, which may comprise capturing a visual representation of a sound track, e.g. using the imaging device(s). The film scanner may be configured to separate image or visual data from sound data for combined scans or images, and may be configured to re-composite the image and sound later, for example, after an image of sound has been converted into digital form.

The at least one imaging device may be configured or configurable to detect infra-red light, for example, the imaging device may comprise a photodetector that is configured or configurable to detect infra-red light. The film scanner may comprise an infra-red light source. The film scanner may comprise an infra-red filter or converter positioned between the film and the at least one imaging device. The imaging device may be configured to collect at least one infra-red image of at least part of the film reel.

Collection of infra-red images in this way has been advantageously found to allow easier detection of scratches. Furthermore, it has also been found that it is easier to read indicia on the film that are comprised of silver, which are sometimes used to encode sound tracks.

The imaging device may be configured to collect a plurality of images having differing exposures for each frame or portion of film, such as at least three images, each having a differing exposure. The imaging device may comprise and/or be operable in an automatic exposure bracketing (AEB) mode. The processing system may be configured to construct an image of the frame or portion of film from the plurality of images of the frame or portion of film having different exposures.

The SLR camera may be operable in a "mirror lock-up mode", i.e. a mode in which an actuating or reflex mirror of the SLR camera is selectively removed from or locked out of the optical path for a duration of a plurality or sequence of exposures. An example of a suitable camera having a mirror-lockup mode is the Canon EOS 1D Mark IV.

Use of a mirror lock-up mode may increase the sustained speed of the camera in stills mode, and may produce less vibration.

The imaging device may be operable in a movie or video mode to collect movie or video streams, e.g. of the film. The movie or video mode may comprise a high definition (HD) video mode (e.g. 1080 rows of 1920 pixels). The film scanner may be configured to strobe at least one light source during collection of movie or video using the movie or video mode. In this way, selected frame, portions of frames or other portions of film may be selectively imaged using the movie or video mode by activating the light source when the desired portion of the film is located in the imaging area of the imaging device. In this way, the selected frames, portions of frames or portions of film correspond to activation of the light source. This may permit the film to be scanned faster. The film scanner may be operable in a real time. Alternatively or additionally, the processing device may be configured to digitally convert the movie or video streams in to a plurality of still images.

It will be appreciated that the features described above in relation to still images may also be applied to the movie or video streams, such as use of an infra-red sensitive image detector and/or compositing or merging of two or more movie or video streams to form a composited or merged video stream in order to increase the resolution.

The imaging device may be movably mounted or mountable to the film scanner, for example, so as to be movable between at least first and second positions. The imaging device may be movable so that the imaging area of the imaging device may be movable so as to cover differing frames and/or portions of frames and/or portions of the film.

The film scanner may be configured to determine images or indicia embedded in the film, for example, in order to determine film aging and/or film processing quality, for example by comparison with a reference, as described in GB1016770.8 or in PCT/GB2011/001450.

The film scanner may be operable as and/or comprised in a densitometer or motion picture inspection device, for example, for use in the system described in GB1016770.8 or in PCT/GB2011/001450.

The film scanner may comprise one or more imaging device mounting portions for releasably mounting corresponding one or more imaging devices and a transit system for changing the portion of the film imaged by the imaging device.

The film scanner may comprise one or more imaging devices that are releasably mounted or mountable to the mounting portions. The one or more imaging devices may comprise digital imaging devices. The one or more imaging devices may comprise a digital camera. The one or more imaging devices preferably and advantageously comprise a digital SLR (single-lens-reflex) camera. The camera may advantageously have a minimum horizontal resolution of greater than 4K pixels and/or a total image size of greater than 15 MB. The camera may be configured to store images in an uncompressed format, e.g. Canon RAW format.

The film scanner may be comprised in a film scanner system, the film scanner system comprising the film scanner and at least one imaging device detachably or releasably mounted to the film scanner.

The film scanner may comprise one or more imaging devices configured to collect an image of an imaging area, a transit system for producing relative motion of the film and the imaging device, and one of more light sources, wherein at least one of the light sources comprises an infra-red light source and at least one of the imaging devices comprises an infra-red imaging device.

The film scanner may be comprised in a film defect detection system, the film defect detection system comprising the film scanner and a processing system configured to identify defects in the film from the infra-red image of the film.

The processing apparatus may comprise or be comprised in the processing system. The processing system may be configured to receive video or still images collected by one or more imaging devices of a film scanner, wherein the video and/or at least some of the images comprise portions of one or more frames of a film and process the images in order to reconstitute a video based on the film contents.

The reconstituted video may be a digital video, e.g. electronically stored.

The processing system or apparatus may comprise a processor and may comprise a network connection and/or an interface for connecting to imaging device(s) of a film scanner and/or a media reader for reading media storing images or videos of a film collected by a film scanner.

The film scanner may comprise a film scanner as described above in relation to the second aspect. The processing system may be configured to convert a video to a plurality of still images.

The processing system or apparatus may be operable to merge or combine the images from a plurality of imaging devices in order to generate a merged, combined or composite image.

In another example, the film scanner may be configured such that the imaging areas of at least two imaging devices at least partially and optionally entirely overlap or and/an imaging device may be configured to collect multiple images of the same portion of film, and the multiple/overlapping images may be combined, merged or composited.

The processing system or apparatus may be configured to process oversampled or overscanned frames of the film. The oversampling or overscanning may comprise collecting multiple images and/or an extended video footage of the frame(s) of the film.

The processing system or apparatus may be configured to identify at least one image portion of at least one frame in each image and match the identified image portions of the at least one frame to corresponding image portions of the at least one frame identified in other images. The processing system may be configured to construct at least one reconstituted image of the at least one frame by forming a composite image comprising image portions of the at least one frame identified and extracted from at least one and preferably a plurality of images collected using the one or more imaging devices. The processing system is configured to detect and correct for defects in the composite image(s) and/or in image portions such as skew and/or frame jitter, which may comprise dynamic detection and/or correction.

The processing system or apparatus may be configured to reject any determined image portion if some property of the determined image portion exhibits a difference from an expected value above a threshold.

The matching of frame portion may comprise filtering for noise and/or compensating for variations in light by position, area and/or time, which may comprise at least one of providing a template or set-up data, performing background measurements or using statistical analysis.

The processing system or apparatus may be configured to determine the frame advance speed of the film, for example, using images and/or video taken by the imaging device.

The processing system or apparatus may be configured to composite, combine or merge images of at least one, e.g. two or more, portions of the film. The processing system or apparatus may be configured to form the digital movie or video (e.g. the video clip) from one or more of the images, and/or one or more composite images, of one or more portions of the film.

The processing system or apparatus may comprise at least one processing unit. Each processing unit may comprise a plurality of processing cores or modules, e.g. at least four processing cores or modules, preferably at least six processing cores or modules and most preferably at least eight processing cores or modules. The processing cores may comprise logical cores.

The processing system or apparatus may be configured to run multiple instances of a compositing program for compositing, combining or merging images of portions of one or more films and/or a modifying program for modifying the images. For example, separate instances of the identification module and/or the image modification module may be implemented on at least two or each processing core or module. The processing system or apparatus may comprise or operate a management application for allocating individual compositing and/or modifying programs to different processing cores or modules, e.g. at least one or each compositing or modifying program may be allocated to a different processing core or module to at least one or each other compositing program.

The film scanner may be configured to image or scan the film, e.g. a reel of film, back to front, e.g. in a reverse direction such as in a direction from the last frame to the first frame. The processing system or apparatus may be configured to flip the images or composited, combined or merged images, e.g. in the vertical axis of the images. The processing system or apparatus may be configured to reverse the numbering or ordering of the images or frames in the composited, combined or merged images or digital movie or video.

According to a third aspect of the present invention is a reading and/or display apparatus for reading digital images and/or digital video clips of a film, the apparatus comprising:
    an input module for receiving and/or reading one or more digital images and/or video clips of a film;
    an identification module for identifying selected regions of one or more digital images or digital video clips of the film; and
    a data extraction module for reading data provided in the selected regions.

Advantageously, the selected regions comprise regions representative of perforations in the film. The film may comprise a filmstrip, for example, as commonly used in the movie industry.

The apparatus may comprise a display unit for displaying images, videos and/or information at least partially derived from the data.

The apparatus may comprise apparatus for reading and/or displaying modified digital images and/or videos produced by the method of the first aspect or by the processing apparatus of the second aspect.

According to an aspect of the present invention is a method of converting the content of a film strip into a digitised version of the content, the method comprising:
    converting a series of images or a video of a film strip into a reconstituted video or series of images depicting the contents of the film strip comprising using a processing system according to the second aspect;
    identifying selected regions of one or more digitized images or digitized video clips of a film; and
    modifying at least one of the one or more digitised images or the digital video clip so as to provide data in at least one of the selected regions.

Particularly beneficially, the selected regions may correspond to one or more perforations in the film.

Alternatively or additionally, the selected regions may be provided at a top or above, a bottom or below, and/or a side or sides of one or more frames of the filmstrip and/or provided in a blanked box imposed on the image, for example.

The data may comprise digital or digitised data.

The content of the film strip may comprise a movie, film, televisual program, or other video or data.

The images or video of the film strip may be collected using a film scanner or processed using a processing system or apparatus described above in relation to the second aspect.

According to an aspect of the invention is a computer program product for implementing the apparatus of the second aspect of the invention or the method of the first or third aspects of the invention.

According to an aspect of the present invention is an apparatus when programmed with the above computer program product.

According to an aspect of the present invention is a carrier medium comprising the above computer program product.

It will be appreciated that features analogous to those described in relation to any of the above aspects may also be jointly or individually and seperably applicable to any of the other aspects.

Aspects and features defined in relation to a method may also provided as a corresponding apparatus and vice versa.

BRIEF DESCRIPTION OF THE DRAWINGS

Various aspects of the invention will now be described by way of example only and with reference to the accompanying drawings of which.

DETAILED DESCRIPTION OF THE DRAWINGS

Figure 1:
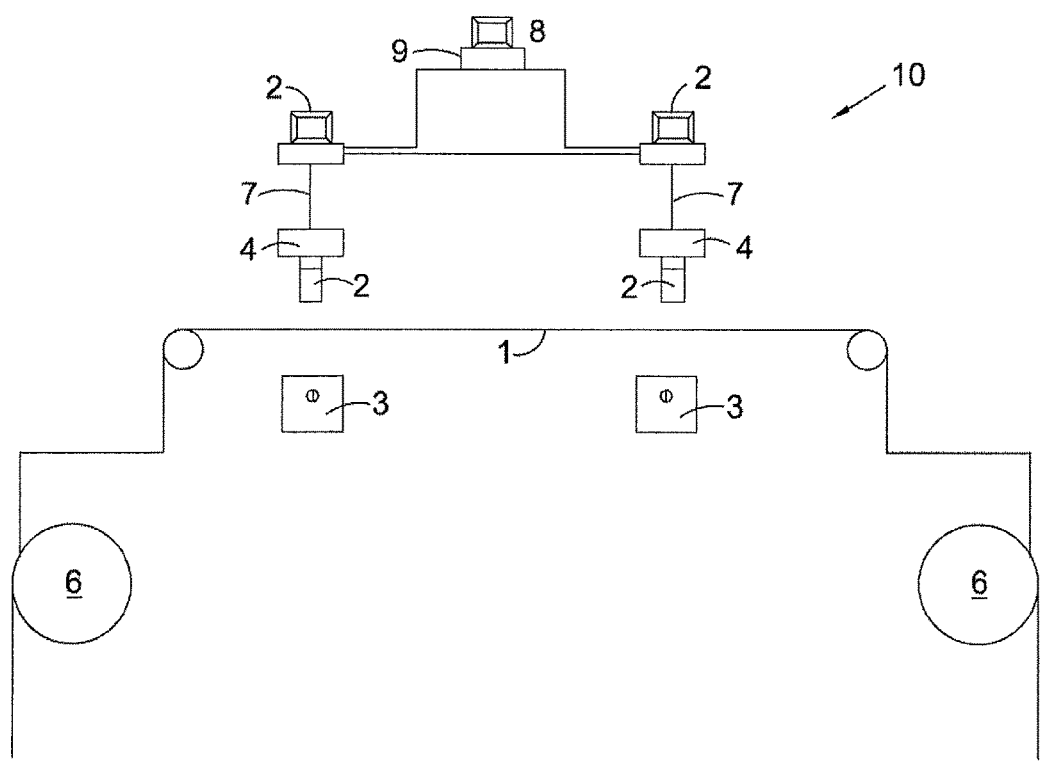
FIG. 1 shows a film scanner according to the present invention.

FIG. 1 shows a film scanner 10 for scanning a photographic film 1, such as a motion picture film, so as to digitize the film into a series of digital images. The film scanner 10 comprises or is connected to a personal computer 2 that acts a processing system for controlling operation of the film scanner and processing images obtained by the film scanner. The personal computer 2 is suitably configured by programming with software.

The film scanner 10 further comprises a pair of light sources 3, LED based light sources 3 being especially suitable due to their stability.

The film scanner 10 also comprises a pair of digital SLR cameras 4 that are operable as imaging devices. The SLR cameras 4 are both releasably mounted to a frame, support (not shown) or other structure of the film scanner 10 so as to be selectively removable and interchangeable. The digital SLR cameras 4 may be mounted using means known in the art, such as a complementary shaped mounting portion and/or threaded connections or the like. The SLR cameras 4 are mounted (or mountable) such that each SLR camera 4 images a differing portion of the film 1. Each SLR camera 4 is configured to obtain a digital image of a corresponding imaging area. The film 1 is then passed through the imaging areas of each camera 4 and images of portions of the film in the imaging area are collected.

Each SLR camera 4 is positioned or positionable relative to the film and provided with means such as a macro lens 5, an extension tube and/or a macro zoom lens such that each camera 4 is configured to image a portion of a frame of the film 1. It will be appreciated that each digital SLR camera 4 is provided with a full frame sensor, i.e. the cameras 4 are operable to take images having a plurality of pixels in two dimensions with each exposure. An appropriate lens or extension tube may be attached to the cameras depending on the gauge or type of film being imaged. In this way, the system may be quickly reconfigured for use with varying film types and gauges.

The digital SLR cameras 4 are connected or connectable to the personal computer 2 via a USB or other suitable connector 7 as is known in the art. In this way, the personal computer 2 is operable to control the digital SLR cameras in order to take images at the appropriate time and to collect images of portions of the film 1 from the cameras 4. It will be appreciated that the personal computer need not be directly connected to the cameras 4 but may instead by remote from the cameras 4 and may be provided with images collected by the cameras 4 using a memory card or other data storage device.

The personal computer 2 is networked, for example to a server 8, such that data from multiple scanners 1, 9 can be collected and also allowing for remote monitoring and support of the film scanner 10. Again, the computer 2 need not be networked but instead data may be shared using other methods, such as using a memory card or other data transport mechanism known in the art.

The film 1 is advanced through the film scanner 10 on film handling rollers 6. The film handling rollers 6 are operable under the control of an embedded controller (not shown) in order to position desired portions of frames of the film 1 in the imaging areas of the digital SLR cameras 4.

The film handling rollers 6 are advantageously part of a film rewind or other conventional film handling system, most advantageously comprising sprocketless rollers, i.e. rollers that wind and rewind reels of film 1 rather than rollers that comprise sprockets that engage with perforations that run along each side of the film strip 1. Conventionally, sprocket based rollers are used in motion picture film scanners as it is important to precisely control the position of each reel of film relative to an imaging device in order to avoid introducing defects into the resulting video, for example due to jitter and/or skew. However, for many older film strips, the film may have distorted, shrunk or warped such that use of sprocket based systems may be undesirable, for example due to an unacceptable amount of handling issues or damage to the film. Furthermore, such sprocket based systems are often expensive due to the level of precision, repeatability and controllability required. In addition, sprocket based systems often require time-consuming reconfiguration, e.g. by changing rollers, in order to handle differing film gauges and types.

Various embodiments of the film scanner 10 are envisioned. It will be appreciated that the features of each embodiment described herein may be seperably and individually or in combination used as alternates or additionally to other embodiments described herein.

Figure 2:
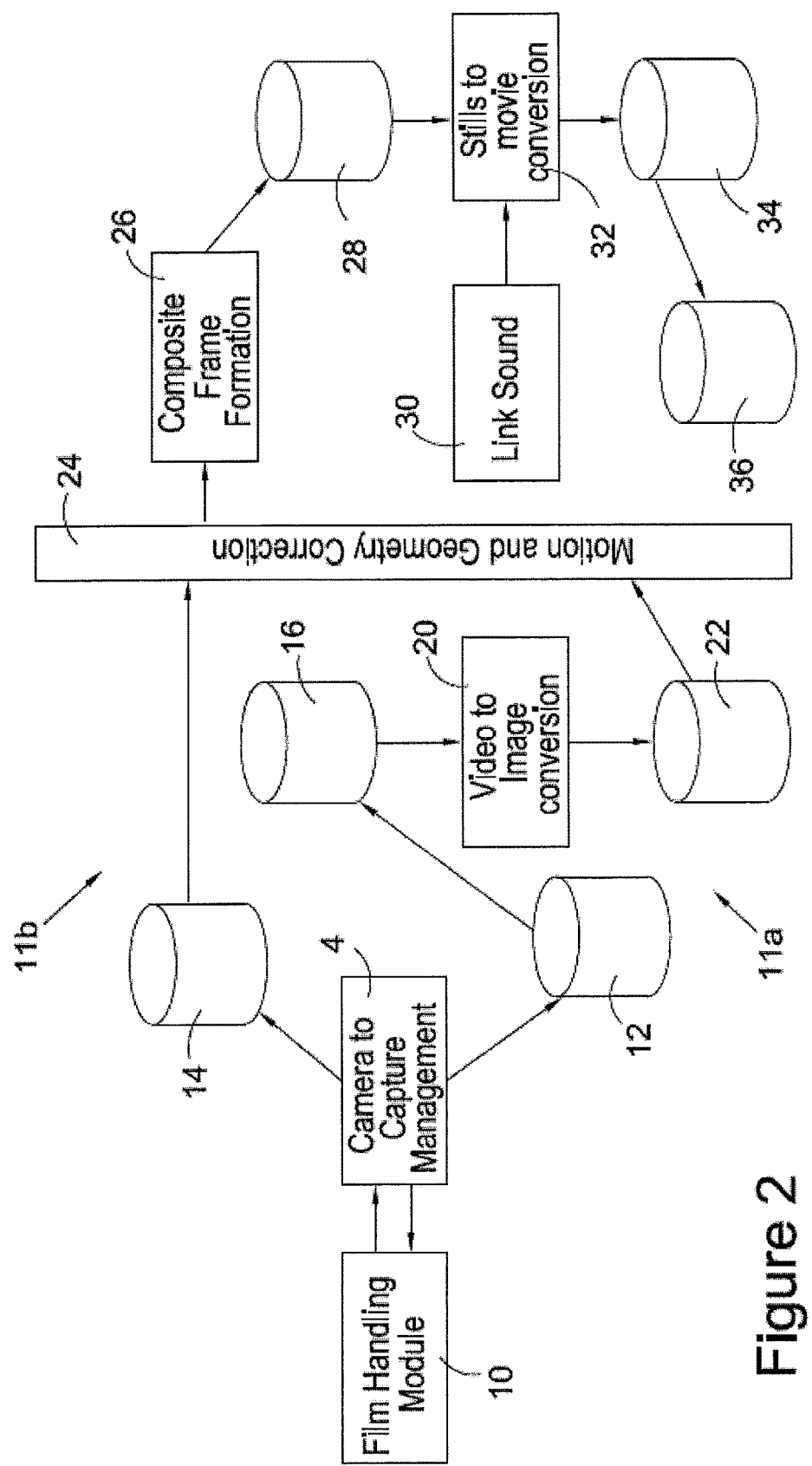
FIG. 2 is a flowchart representing a method of scanning a film using the film scanner of FIG. 1.

An embodiment of the operation of the film scanner 10 is discussed in relation to FIG. 2.

In a preferred embodiment, a reel of film 1 is continuously wound/rewound between the sprocketless rollers 6 of a film handling module 11. The scanner is optionally provided with means for estimating a frame advance rate (e.g. a wind/rewind speed) of the film 1. One example of suitable means is an IR sensor/light gate (not shown) configured to detect perforations of the film 1 as they pass through the light gate. In this way the scanner is able to estimate the current wind/rewind speed of the film 1. Alternatively or additionally, the estimated wind/rewind speed may be determined by communications between the controller of the wind/rewind system and the computers 2.

The cameras 4 are configured to take a video or a series of still images of the film as it passes. It will be appreciated that the imaging devices are operable in a video capture mode 11a or a still images mode 11b. The video or series of still images are stored in suitable storage 12, 14, which may be, for example, provided in the camera 4 or on the computer 2. The video images are then transferred from the temporary storage 12 to an appropriate local repository 16 which may be provided on the computer 2 or the server 8, for example. The transfer may be over a network or by use of a memory card or other means known in the art.

In the case of video mode, the computer 2 or server 8 is configured to convert the video into a series of still images in step 20.

In stills mode, the camera 4 is configured to oversample each frame of the film 1, e.g. the image collection rate of the camera 4 is faster than the time it takes a frame of the film 1 to transit the imaging area of the camera 4 in question. This may be straightforwardly determined using the estimated frame advance rate or film wind/rewind speed, as detailed above.

In video mode, the over sampling may be achieved by setting an appropriate sampling rate in the video to still image conversion process 20, such that at least part of each frame of the film 1 appears in a plurality of images extracted from the video. The series of still images extracted from the video are stored in a suitable repository 22, such as on the computer 2 or server 8.

In this way, regardless of whether the cameras 4 are configured to collect a series of still images or a video of the film 1 as it transits the imaging area of the camera 4, the result is a series of still digital images of the film, in which each frame of the film is oversampled, i.e. each portion of each frame appears in two or more images. An example of this is shown in FIGS. 3A and 3B, which show examples of sequential images of a film 1 collected by the cameras 4.

Figure 3A:
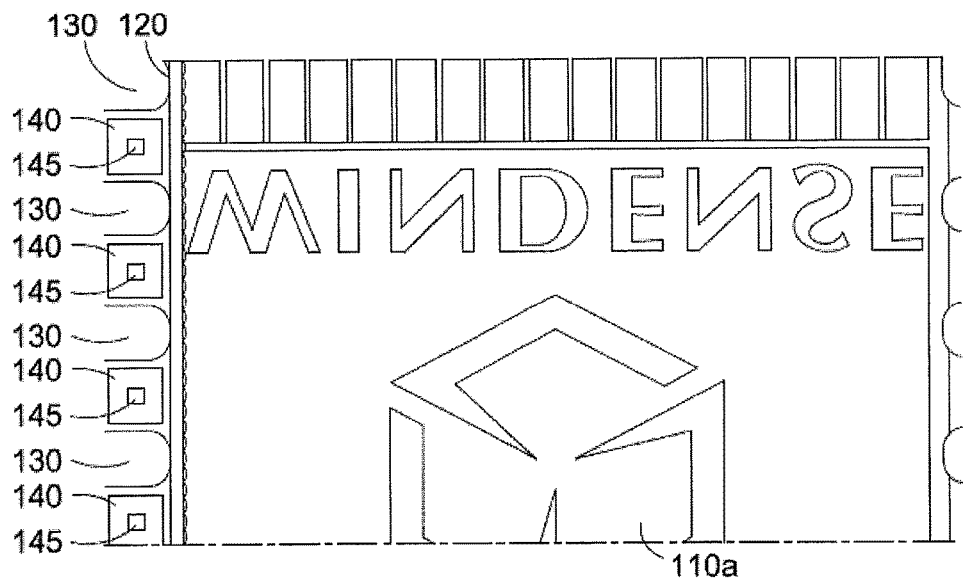
FIGS. 3a and 3b are sequential images taken using one of the imaging devices of the film scanner of FIG. 1.
Figure 3B:
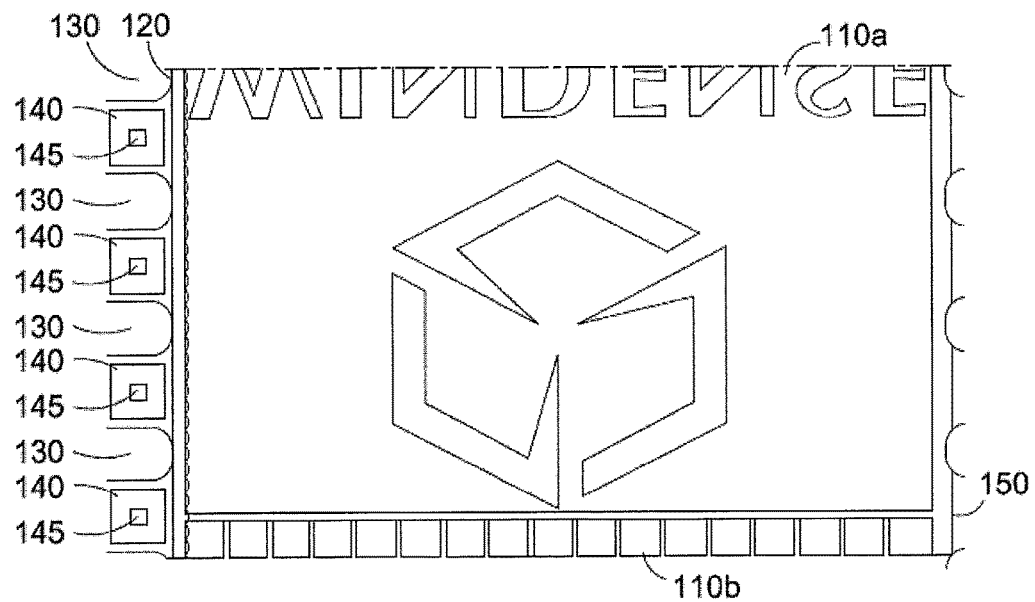

One image, as shown in FIG. 3A, comprises most of a frame 110a, along with an analogue soundtrack 120, a series of perforations 130 down one side and digital soundtrack data 140 provided between the perforations. In the next image, shown in FIG. 3B, whilst a portion of frame 110a can still be seen, a portion of the next frame 110b can also be seen. A frame line 150 separates the two frames 110a, 110b. Furthermore, it can also be seen that the perforations 130, the analogue soundtrack 120 and the digital soundtrack 140 have also advanced correspondingly.

A processing system (e.g. on the computer 2 or the server 8) is configured to apply motion and geometry corrections to the images, in a step 24. The processing system is also configured to break down each image into component image portions and match image portions belonging to each frame and create a series of images, each image representing the contents of a corresponding frame 110a, 110b of the film by merging and/or compositing the matched component image portions.

This process has several advantages. Namely, the process allows the film handling module 11 to be operated in a continuous operation mode, and at relatively high speed. Furthermore, the frame advance rate need not be as accurate as in other systems, allowing the use of cheaper and more versatile sprocketless drive systems and the like. In addition, the resulting image quality can be provided to an acceptably high standard, in a relatively low cost and readily adaptable scanner system.

Beneficially, the processing system can comprise multiple processors and/or a multi-core processor. In this case, a software architecture is provided that uses a management application to create and control multiple instances of a program for extracting, compositing, merging and/or modifying the images of the film. In this way, individual programs can be allocated to different processors or cores. This arrangement may greatly increase system throughput.

The processing system uses a matching algorithm to match portions of each frame in each image. In a particular example, lines of each frame 110a, 100b are matched between sequential images. Suitable matching algorithms would be apparent to a person skilled in the art. Each portion is an example of an image portion according to the present invention.

The processing system applies an algorithm that compensates for noise and light source variation with location in the image and also with time. Such compensations may be based on configuration data predetermined and provided to the system at manufacture or generated using background image collection or using statistical methods or other techniques that may be apparent to one skilled in the art.

For example, a given LED light source 3 may be darker at the top right hand corner than the bottom left hand corner of an image. This will have been identified at initial or periodic calibrations or from background or statistic data and used to form configuration data that appropriately digitally increases the brightness of the image at the top right hand corner and/or reduces the brightness at the bottom left hand corner, such that the properties of each line of a frame shown in each image is comparable regardless of where they are in relation to an image area. Similar configuration data can compensate, for example, for variation of light output of the light source with time, and so on.

The processing system is configured to identify portions (e.g. one or more than one successive row) of each frame that can optimally serve as indicative portions. The image portions can be selected to give the highest sensitivity to movement according to the matching algorithm. As an example, this may be done by determining portions of the frame having a high or highest contrast, e.g. a contrast above a threshold.

Other examples of suitable indicative portions include portions of the analogue soundtrack 120 that extends alongside the image frame 110a, 110b or the location of the perforations 140 or features of the digital soundtrack 140. Advantageously, periodic indicia or marking may be provided, such as the Dolby® logo 145 in a Dolby® digital soundtrack, and these periodic marking may be conveniently utilised as indicative portions. The frame lines 150, also make convenient indicative portions.

Advantageously, combinations of two or more of the above types of Indicative portions may be used. In this way, if the usefulness of one type of one type of indicative portion is reduced then this minimises the effect that this will have or allows use of other types of indicative portions that may be less affected.

The processing system is optionally configured to construct maps of indicative portions, for example, indicating the relative positioning of a plurality of indicative portions in two dimensions.

The processing system is then configured to determine an actual frame advance rate based on the relative positions of the indicative portions of each frame in successive images. This allows a frame advance rate to be accurately determined, regardless of the consistency of the frame advance rate provided by the film handling module 11. This can lead to improved quality in the generated final digitised movie and/or allows the use of cheaper, simpler and/or more versatile film handling modules 11.

The relative position of indicative portions can also be used to identify and correct geometric and motion defects in the images, such as skew and jitter. In particular, using maps of indicative portions allows the relative movement of indicative portions in two dimensions to be monitored over several points of the image and/or one or more frames, which may permit quick and simple detection and correction of geometric and motion errors.

Use of indicative portions in these processes may reduce the processing required and/or speed up the image conversion process and/or improve the quality of the output.

Advantageously, the processing device is configured to estimate the position of indicative portions or image portions in subsequent frames based on the determination of the corresponding indicative and/or image portion in the present and/or previous frames and the determination of the current frame advance rate made by the processing system, as described above and/or a determination of the frame advance rate determined using apparatus such as the IR light gate for detecting perforations or a network connection to the film handling module 11. This estimation process may reduce the computational load and/or allow faster conversion of the image data.

When identifying a corresponding image portion or indicative portion of a frame in an image, the processing system is configured to start the search (i.e. the matching algorithm) in a tolerance area around the estimated position. The tolerance area can advantageously be set depending on a spread or variation in the determined frame advance speeds. If no match is found in the initial tolerance area, then the tolerance area is successively widened for a predetermined number of iterations until a match is found or the number of predetermined iterations is exhausted, in which case, no match is determined.

There are a variety of techniques that can optionally be used by the processing system to form a composite image. An example of suitable technique is a single-join mode, in which the next frame that is likely to contain information not in the current frame is computed, and then the processing system searches from that point on for a repeat line. All the data in the current frame is then copied into the composite image and the system advances to the repeat line position in the new frame. In this way, intermediate frames are never loaded or processed. Using a different technique—'multi-join'—all the number of lines advanced between each frame are copied in i.e. a join for each frame.

If a matched image portion is found to have too great a difference from expected, e.g. outwith a threshold used in the matching algorithm or a separate, stricter threshold, then it is discarded. This may prevent anomalies in individual images or parts of images from affecting the final image.

After each image portion for each frame has been determined from the plurality of images and matched to corresponding image portions from other images by the matching algorithm, the image portions for a given frame can be combined, e.g. by merging where two or more corresponding image portions are available, and/or by compositing the image portions for different areas of the frame image in order to reconstitute a digital copy of the image depicted in the frame 110*a*, 110*b*.

When reconstituting the image depicted in each frame 110*a*, 110*b*, the image area can be dynamically detected and centred within frame lines in order to minimise frame to frame jitter. Furthermore, systematic optical defects such as skew induced by camera misalignment can also be corrected.

The series of reconstituted digital images corresponding to the images depicted in each frame of the original film 1 are then stored in a suitable repository, for example, on computer 2 and/or server 8, as indicated in step 28. After this, the sound track obtained from the analogue 120 and/or digital 140 soundtracks of the original film 1 are synched and added in step 30 during conversion of the series of reconstituted digital images into a digital movie format such as a .mov or similar format, as indicated in step 32. The digitised movie is stored in a local video repository 34 before being provided back to local storage for access 36.

Optionally, the scanner is configured to scan reels of film from back to front, whereafter the processing system is configured to flip or invert the images in the vertical axis of the image and reverse the numbering or ordering of the frames. In this way, the need to rewind the reel of film may be removed or reduced. This reduced handling of the film is particularly useful in the scanning of important, fragile and/or old film reels.

The above process conveniently allows the series of digital images derived from the cameras 4 to be split into work packages of sequential images such that the motion and geometry corrections and/or the matching of image portions and reconstitution of digital images and ultimately the final movie can be carried out in a distributed or batch fashion, for example, by using several computers or other processing systems. In addition, it allows such processing to be carried out either in real time or at a later date to the image collection and either locally at the image collection location or remotely. This flexibility may offer significant advantages as the processing can be carried out in such a way as to best suit the varying circumstances of the users.

Figure 4:
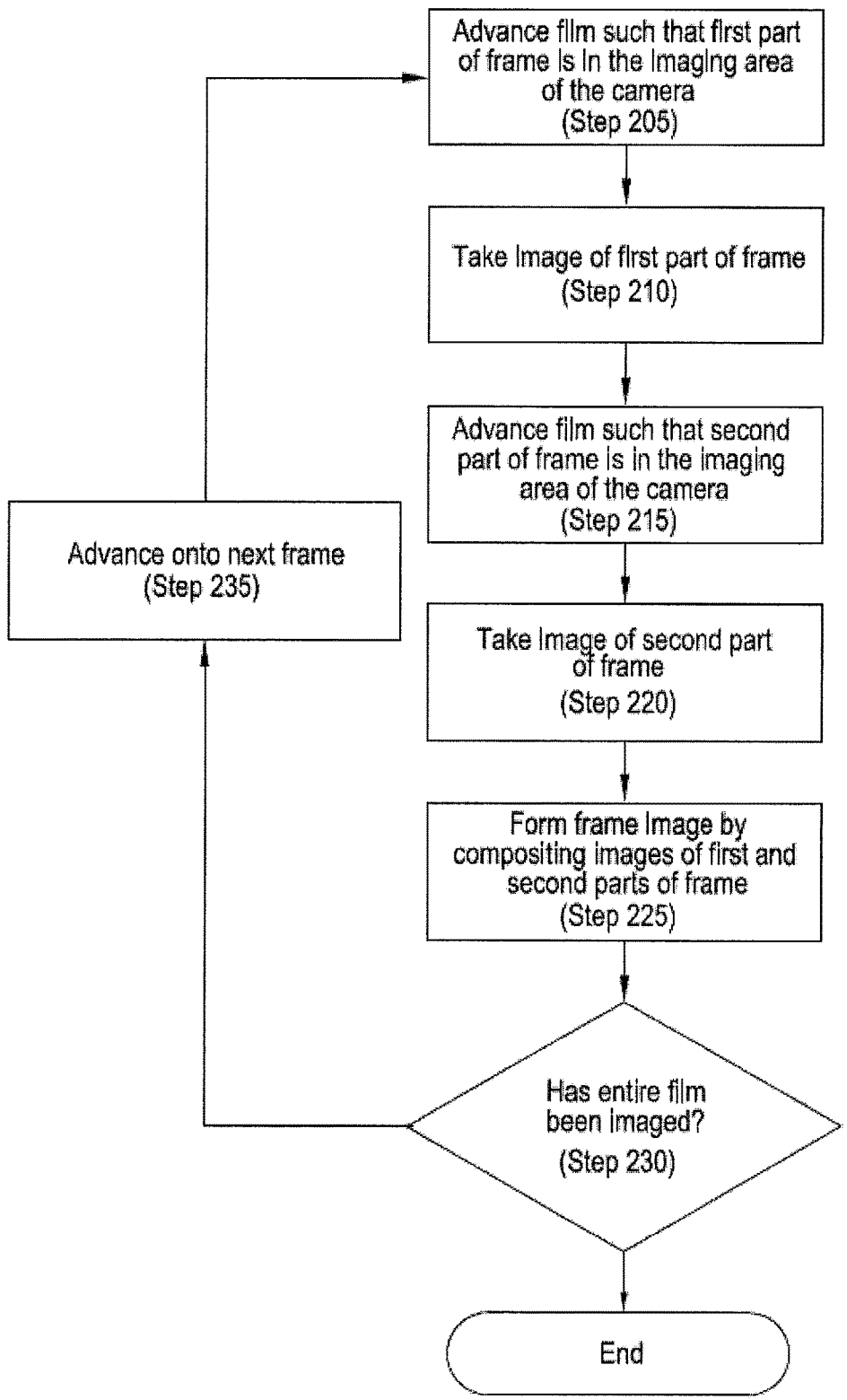
FIG. 4 is a flowchart representing an alternative method of scanning a film using the film scanner of FIG. 1.

In another embodiment, as shown in FIG. 4, the film 1 is advanced such that a first portion of a first frame of the film 1 is within the imaging area of one of the SLR cameras 4 (step 205). The light source 3 associated with the camera 4 is activated to illuminate at least the first portion of the film 1 and the SLR camera used to collect a digital image of the first portion (step 210). Thereafter, the film is advanced such that a second portion of the first frame is within the imaging area of the digital camera 4 (step 215), the second portion is illuminated using the light source 3 and an image of the second portion taken using the digital SLR camera 4 (step 220).

The personal computer 2 is operable to retrieve the images of the first and second portions of the first frame from the digital SLR camera 4, whereupon the personal computer 2 is configured to composite the two images together in order to form a composited image that represents the whole of the first frame (step 225), using image compositing techniques known in the art.

It is then determined if the entire film 1 has been imaged (step 230). If it is determined that the entire film has not yet been processed, then the film 1 is advanced onto the next frame (step 235), and the process repeated in order to image the subsequent frame of the film 1. In this way, the process is repeated until each frame of the film 1 has been imaged.

By using the macro lens 5 and extension tube so as to image only a part of each frame at a time with each SLR camera, an acceptably high resolution image of each frame may be obtained. Although imaging of each frame by compositing two portions is described above, it will be appreciated that this need not necessarily be the case, and instead, each digital SLR camera 4 may be operable to image more or less than two parts of a frame at a time or a whole frame or even multiple frames at a time. Furthermore, both portions of each frame need not be imaged by the same SLR camera 4.

For example, two (or more) SLR cameras 4 may be provided and multiplexed together, wherein each SLR camera 4 is arranged to image a differing portion of a frame of the film 1. The image of each frame may then be formed by compositing the images of varying portions of the frame taken by differing SLR cameras 4.

Advantageously, the film scanner 10 is optionally provided with infra-red imaging capability. This may be provided additionally or alternatively to visible light imaging. For example, the film scanner 10 may be provided with one or more first imaging device, in the form of digital SLR cameras 4, for collecting visible light images of the film 1 and one or more second imaging devices, in the form of IR sensitive detectors, for imaging infra-red images of the film 1. The infra-red imaging devices may advantageously comprise digital SLR cameras 4 adapted to image infra-red light. For example, a digital SLR camera such as the Canon EOS 5D can be used as an infra-red imaging device, wherein the photo sensor of the camera is converted from visible light sensitivity to IR sensitivity. The visible light and infra-red imaging devices may optionally comprise the same imaging devices configured to image both visible and infra-red light. The light sources 3 comprise one or more infra-red light sources.

In this way, the film scanner 10 is configured to take infra-red images of the film reel 1. Certain scratches and other damage to the film 1 has been found to be more visible with infra red imaging and such infra-red images can be advantageously used to identify (and quantify) these scratches and other damage (for example using image recognition, pattern matching, thresholding and other techniques that would be apparent to a skilled person).

In addition, some films use silver to encode a soundtrack to the film. The use of infra-red light advantageously permits the silver used to encode the soundtrack to be identified and digitized, and thereby improving and expanding the optical scan.

Optionally, at least one of the digital SLR cameras 4 is operable in an automatic exposure bracketing (AEB) mode. In this configuration, the digital camera 4 takes a plurality of images (typically three images) of each portion of each frame of the film 1, wherein each image has a differing exposure to each of the other images. For example, the digital camera 4 may be provided with exposure determining apparatus for determining an optimal exposure or be provided with pre-set or default exposures. In one example of an AEB mode, the digital camera 4 is configured to collect at least a first image at the determined, pre-set or default exposure, a second image that is overexposed relative the first image and a third image that is underexposed relative to the first image. The degree of under or over exposure may be determined, for example, by using a predetermined offset. The processing system 2 is then configured to form a composite image of each portion of each frame by compositing the first, second and third (i.e. optimal, under and over exposed images) together to form a high quality composite image. In this way, each exposure may highlight different features of the film, and by using an image of the film 1 formed by compositing images having differing exposures, a higher quality image may be obtained. Similar results can be achieved by using cameras set to different ISO (i.e. light sensitivity) or exposure settings to achieve greater exposure, which may be performed with either a plurality of cameras or multiple runs of a film, wherein each run has a different ISO or exposure setting.

As is known in the art, SLR cameras comprise an actuating or reflex mirror that is operable to selectively direct light received through a collecting lens of the camera between a viewfinder or an image detector (e.g. a CMOS or CCD array) of the camera 4. Optionally and advantageously, the digital SLR camera 4 is operable using a "mirror lock up" mode, i.e. a mode in which the actuatable or reflex mirror remains in a position in which it is out of the optical path of the camera (i.e. so that light received through the collecting lens is directed to the image detector rather than the viewfinder) over multiple exposures, without actuating the mirror into the optical path between the exposures.

Many modern digital SLR cameras are capable of high definition (HD) movie or video collection (e.g. at or greater than 1920×1080 pixels). This video or movie can also be utilised to image the film. Examples of suitable techniques for selectively imaging a desired part of the frame include use of strobe or very fast shutter speed (e.g. at least 1/8000 in stills mode or at least 1/4000 in video mode). Although not impossible, it is preferred not to use strobing with video collection taken by imaging devices that use rolling shutter, as this may lead to defects in the collected image. In this way, the image of the required portion of the film 1 can be collected whilst the film 1 is moving, thereby speeding up the frame scanning process. Similarly to the scanning process using still images described above, two or more video streams, e.g. taken by two or more cameras 4 operating in video or movie mode can be combined in order to produce a higher resolution image. Similarly, the use of HD video in combination with infra-red illumination and image collection can be used to produce a high speed error or defect detection system and/or to incorporate sound track data in the scan. In addition, a plurality of imaging devices using different exposure settings can be employed to utilise AEB.

Although the above example uses film handling apparatus 6 and optionally two or more digital SLR cameras 4 to selectively image portions of the film 1, it will be appreciated that at least one of the digital SLRs 4 may be movable, repositionable and/or pivotable, such that the same camera 4 is can be moved, repositioned or reoriented to take images of differing parts of the film 1/each frame rather than (or in addition to) the film 1 being movable. The images of each portion of the film 1/frame may then be merged/composited as described above to form a higher resolution image.

Figure 5:
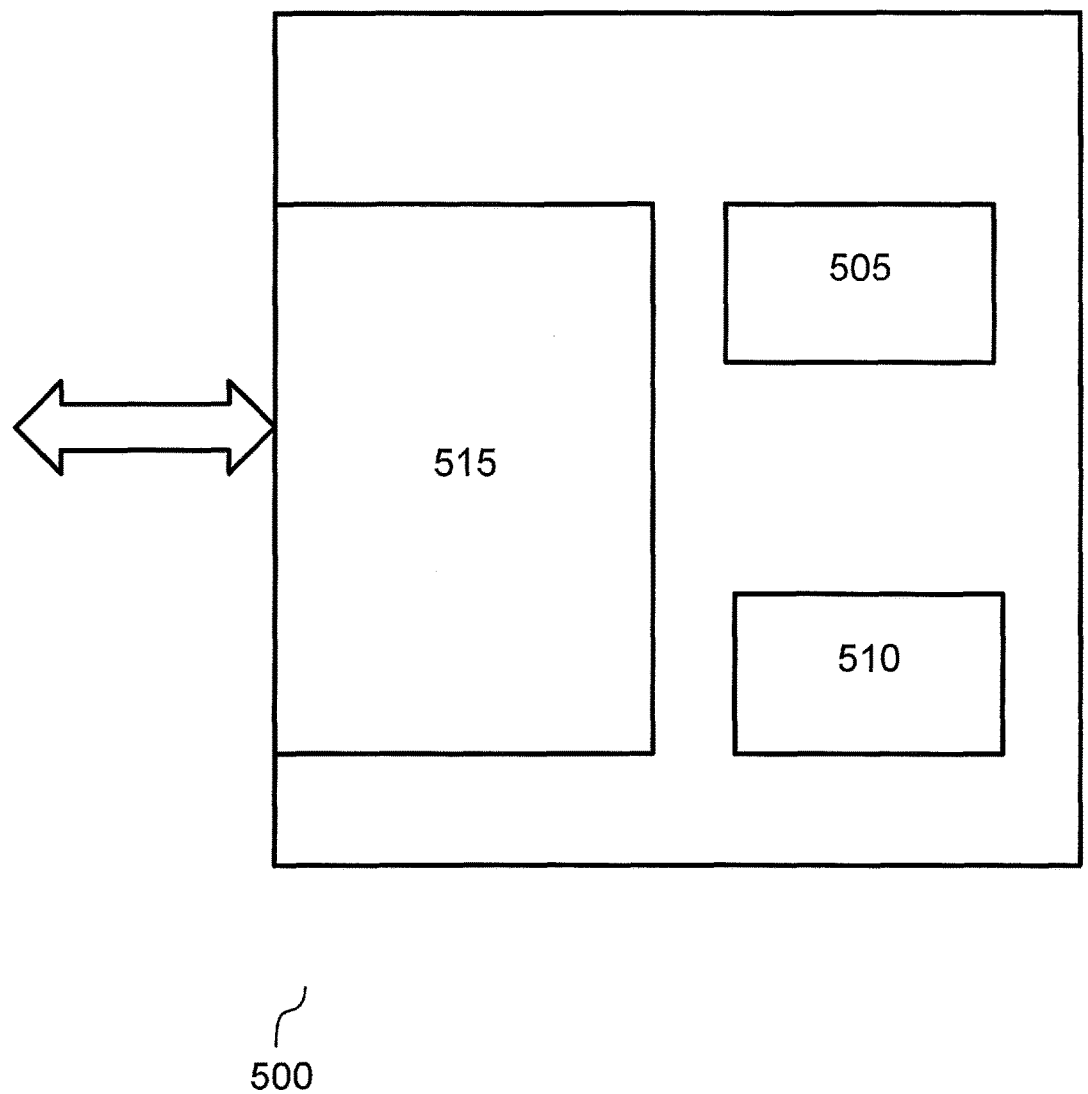
FIG. 5 is a schematic of a processing system for processing digital images and/or videos of a film.
Figure 6A:
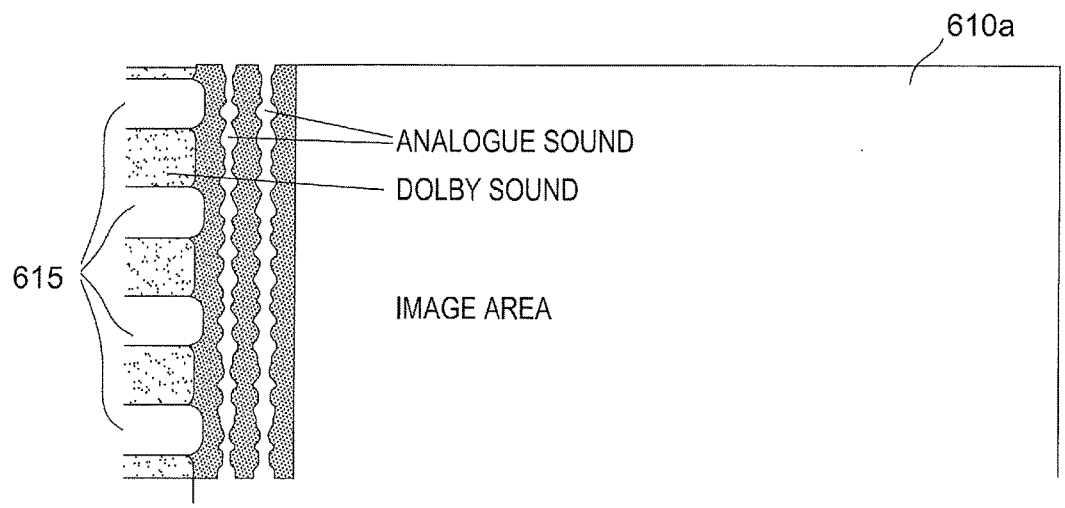
FIG. 6a is a digitized image of a frame of a film.

FIG. 5 shows a processing system 500 for processing digital images 610*a* (see FIG. 6*a*) and/or digital videos of a at least portions of a film. In embodiments, the processing system 500 is incorporated in the film scanner 10 described above and is configured to process the digital images 610*a* and/or digital video clips generated by the film scanner 10.

However, it will be appreciated that in other embodiments, the processing system 500 can be incorporated in other types of film scanners or indeed need not be incorporated in a film scanner at all and instead be configured to receive or access digital images 610*a* and/or videos of at least portions of film strips, for example, from a database, archive, file server, memory, storage medium or any other suitable storage means (not shown).

The processing system 500 comprises an identification module 505 for identifying pre-set, selected or specified regions 615 (see FIG. 6*a*) of one or more digital images 610*a* or digital video clips of a film that are substantially blank or can be written over.

Particularly advantageous parts of the digital images 610*a* that can be beneficially used as the pre-set or specified regions 615 according to embodiments of the present invention are the areas of the digital images 610*a* corresponding to the perforations in the filmstrip that are used by sprocket drive systems to advance the filmstrip. By their very nature, the areas of the digital images of the film corresponding to the perforations are blank, as can be seen from FIG. 6*a*, and are generally not used by display systems to display the movie, programme or other presentation stored on the film. As such, these areas of the digital images 610*a* advantageously provide a suitable part of the image 610*a* that is inherently free for use as the pre-set or specified regions 615 for storing additional data (620*a*, 620*b*, 620*c*). However, it will be appreciated that other pre-set or specified regions of the images could be used, such as the areas immediately above, to the side of or below each frame.

The processing system 500 further comprises an image modification module 510 for modifying at least one of the one or more digital images 610*a* or the digital video clip so as to provide the additional data 620*a*, 620*b*, 620*c* in at least one of the regions 615 corresponding to one or more perforations in the film. The processing system 500 further comprises a communications unit 515 for receiving digital images 605*a* (such as that shown in FIG. 6*a*) from, and/or providing modified digital images 605*b* (such as that shown in FIG. 6*b*) to, a source of digital images or video clips of the filmstrip, such as the film scanner 10 described above, other film scanners or a suitable data store or archive, for example.

The identification module 505 can be configured to use suitable image processing techniques such as pattern matching, thresholding, pattern recognition and the like to identify the portions 615 of the digital images or digital video clips of film that correspond to the pre-set or specified regions in the filmstrip. Various properties of the pre-set or specified regions 615 can be used to assist the identification process. For example, in embodiments where the pre-set or specified regions 615 correspond to perforations, the perforations of a film are generally located at the sides of the film, are generally periodic and are, by definition, empty of information. In addition, the size and shape of the perforations may be standardized. Other properties of the pre-set or specified regions 615 that could be used to identify the pre-set or specified regions 615 would be apparent to a skilled person. The identification module 505 is optionally configured to recognise or use one or more of these properties in order to identify the pre-set or specified regions 615 in the digital image 610*a*.

Figure 6B:
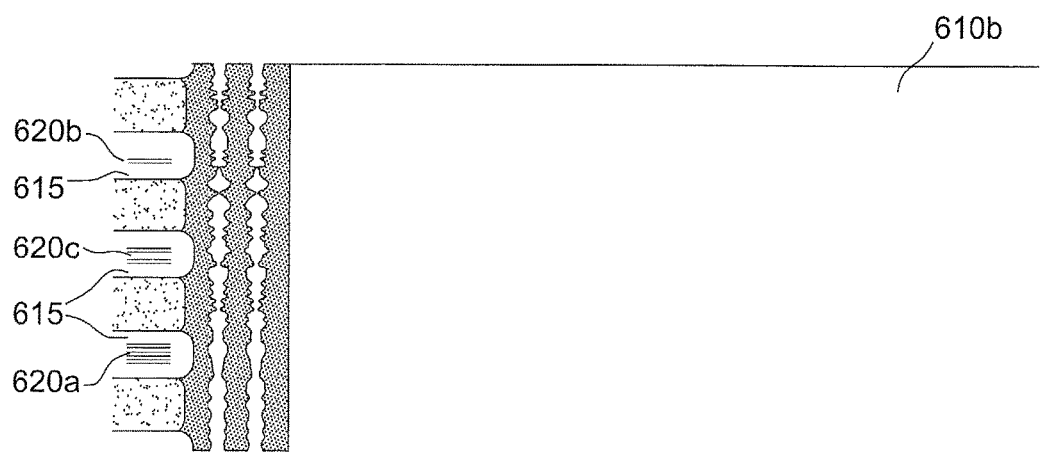
FIG. 6b is the image of FIG. 5a that has been modified to incorporate further data.

The image modification module 510 is configured to modify the portions 615 of the digital images and/or digital video clips corresponding to the pre-set or specified regions in order to store the additional data 620*a*, 620*b*, 620*c*. The additional data may be represented as an image, text, 2D or 3D barcode, or any other suitable data representation mechanism known in the art. The resulting modified digital image 610*b* is shown in FIG. 6*b*.

Examples of additional data that can be stored in this way include operation data or parameters 620*a* such as at least one of an embedded test pattern, resolution, colour space and/or the like. Such data 620*a* can be used, for example, to allow display systems that display the one or more digital images and/or the digital video clip to be calibrated, advantageously "on the fly". This data 620*a* could be used, for example, to set at least one display property of the display system. The data 620*a* could also be usable, for example, to check degradation of other data storage mechanisms of the film, such as the image area, analogue soundtrack or digital soundtrack.

In particularly advantageous embodiments, the additional data encodes one or more soundtracks or set of subtitles associated with the film stored on the filmstrip. For example, various translations of the original soundtrack can be stored using the data applied to the pre-set or specified regions 615 of the digital images. Beneficially, the data applied to the pre-set or specified regions 615 can be used to store one or more enhanced versions or original versions of the soundtrack and/or the images represented in the frames of the film. In this way the viewer can have the benefit of modern digitally enhanced images and soundtrack but the original frame images and soundtrack are retained, for example, for historical interest, or to preserve the original recording so that improved enhancement techniques that are developed at a later date may be used, or to allow correction of errors and defects in the enhancement and the like.

In other embodiments, the additional data is used to encode additional embedded images such as advertising, mini-features, extra scenes and the like. Another example of use of the additional data encoding is to encode links to remote data, such as hyperlinks using the data to embed the links in the digitised image. The image reader can then be configured to read and extract the encoded hyperlinks and access remote data from the hyperlinked location.

The additional data could also be used to store cross referencing or indexing data. For example, the cross referencing data could be used to store information on a film type, scene type, actors, content specific types, geography, history and the like, in order to allow the digital images of the filmstrip to be easily searched and archived, particularly by automated search tools.

The additional data could also be used to encode information relating to the scanning process such as scanning credits identifying the organisation, operator, techniques, parameters, dates and the like.

Beneficially, the data can be used to store encryption seeds in a digitally encoded form. The encryption seeds could be used to access other encrypted data, which could be stored in the digitised images or elsewhere.

The data could optionally comprise identification data, information, or other data such as at least one of copyright information, branding information 620*b*, information relating to the films 620*c*, such as a title, and/or the like.

Other examples of data include information associated with other frames such as preceding or following frames. Such information may, for example, be usable to check for deterioration of the film and/or assist restoration of degraded films.

It will be appreciated that the scan apparatus and techniques described above provide reading and/or writing of the encoded additional data with a high degree of accuracy, which allows higher density data storage techniques to be used and permits the storage of some of the data types identified above, such as soundtracks and images, that require a large amount of storage.

In view of the above, a skilled person will appreciate that variations of the disclosed arrangements are possible without departing from the invention.

For example, although various features of the invention are described in relation to apparatus features, it will be appreciated that corresponding method features are also intended, and vice-versa.

In addition, whilst two cameras, two light sources and two computers are described above, it will be appreciated that the process may equally be carried out with one or more cameras, one or more light sources and/or one or more computers.

Furthermore, whilst the above describes encoding data that is representative of digitally enhanced, error corrected or otherwise varied versions of a movie in the perforations of the scanned images or video clip of the filmstrip, it will be appreciated that instead of representing actual images in the data, the data written or encoded onto the perforation areas of the images or video clips can comprise data for forming processed images and/or soundtracks and/or video clips from the original or other images and/or soundtracks and/or video clips. For example, the processed data may represent a full range exposure version of the original digital image or digital video, wherein the minimum exposure values of the pixels of the digital image(s) or digital video clip are set as zero or the minimum exposure value and the highest exposure values of the pixels are stretched to a maximum exposure value (e.g. 255) and the intervening exposure values are scaled accordingly, i.e. the exposure values are stretched between the maximum and minimum values. However, the actual full range exposure images or video need not be stored. For example, conversion data, such as a look up table or the like, that converts the original digital image or digital video (in this example, converts the exposure values of the digital image or digital video clip) into the processed data may be digitally encoded and stored in the selected area instead.

Accordingly, the above description of the specific embodiment is made by way of example only and not for the purposes of limitation. It will be clear to the skilled person that minor modifications may be made without significant changes to the operation described.

The invention claimed is:

1. A method of producing or modifying a digital image or digital video clip of at least part of a photographic processed film, the method comprising:
   providing the photographic processed film which is in a developed state;
   accessing or producing an additional data;
   identifying portions of one or more digital images or digital video clips of the photographic processed film that represent a plurality of perforations in the photographic processed film each having a free space; and
   modifying at least one of the one or more digital images or digital video clips of the photographic processed film so as to provide or encode the additional data in the free space of at least one of the plurality of portions that represent perforations in the photographic processed film.

2. The method of claim 1, wherein the additional data comprises digitally encoded or encrypted data; or
   wherein the additional data comprises or is representative of one or more soundtracks and/or subtitles; or
   wherein the additional data comprises or is representative of one or more digitally enhanced images and/or soundtracks.

3. The method of claim 1, wherein the additional data comprises soundtrack data that has been translated into one or more different languages and/or comprises or is representative of commentary audio annotations, and/or descriptive versions of the soundtrack for the visually impaired.

4. The method of claim 1, wherein the additional data comprises or is representative of additional digitally encoded images, images from a mini-feature, and/or advertising; or
   wherein the additional data comprises or is representative of data associated with the scanning process; or
   wherein the additional data comprises indexing, cross referencing and/or other information associated with the photographic processed film or a scene represented in one or more frames of the photographic processed film; or;
   wherein the additional data comprises encryption seeds or keys.

5. The method of claim 1, further comprising the step of scanning one or more films using a digital imaging device to generate the one or more digitized images or digitized video clips of the photographic processed film; and
   wherein the additional data comprises or is represented by an image, text, 2D or 3D barcode.

6. The method according to claim 1, wherein the producing or modifying of the digital image or digital video clip and/or compositing, combining or merging the digital images and/or video clips of the photographic processed film is carried out by multiple instances of a compositing and/or modifying program and the method comprises allocating individual compositing and/or modifying programs to different processing cores or modules.

7. The method according to claim 1, further comprising the steps of:
   scanning the photographic processed film back-to-front,
   flipping the digital images of the photographic processed film and/or one or more of a composited digital image, one or more of a combined digital image or one or more of a merged digital image, and
   reversing the numbering or ordering of the digital images of the one or more frames of the photographic processed film and/or the one or more of a composited digital image, the one or more of a combined digital image or the one or more of a merged digital image.

8. A method of producing or modifying a digital image or digital video clip of at least part of the photographic processed film of claim 1, wherein said photographic processed film is a motion picture film.

9. A processing apparatus for processing digital images and/or digital video clips of a photographic processed film, the processing apparatus comprising:
   an identification module for identifying portions of one or more digital images or digital video clips of the photographic processed film which is in a developed state and which has a plurality of perforations in the photographic processed film each having a free space;
   said identification module adapted to identify free space portions of one or more digital images or digital video clips of the photographic processed film that represent the free spaces of the perforations in the photographic processed film; and
   an image modification module configured to access or produce additional data; and modify at least one of the one or more digital images or the digital video clip of the photographic processed film so as to provide the additional data in at least one of the identified free space portions.

10. The processing apparatus according to claim 9, wherein the processing apparatus comprises a communications unit for receiving the one or more digital images or digital video clips of the photographic processed film, from at least one of a scanner, a database, a data store, memory or other storage device.

11. The processing apparatus according to claim 9, comprising a digital imaging device for scanning the one or more films in order to generate the one or more digital images or digital video clips of the photographic processed film.

12. The processing apparatus according to claim 9, configured to implement method steps comprising:
producing as modified one or more digital images or digital video clips of the photographic processed film having at least one of the free space portions having the additional data.

13. A processing apparatus for processing digital images and/or digital video clips of the photographic processed film of claim 9, wherein said plurality of perforations are perforations of a motion picture film.

14. A reading and/or display apparatus for reading digital images and/or digital video clips of a photographic processed film, the apparatus comprising:
said photographic processed film which is in a developed state having one or more of a perforation having a free space region;
an input module for receiving and/or reading one or more digital images and/or digital video clips of the photographic processed film which is in a developed state, said input module receiving and/or reading one or more digital images and/or digital video clips of one or more of said free space region of the one or more said perforation of the photographic processed film;
at least one or more of the digital images and/or digital video clips of the one or more of said free space region having an additional data added to the digital images and/or digital video clips of the one or more of said free space region,
an identification module for identifying one or more digital images and/or digital video clips of said free space region of one or more of said perforation of the photographic processed film;
and
a data extraction module for reading the additional data of said one or more of said free space region.

15. A reading and/or display apparatus for reading digital images and/or digital video clips of the photographic processed film of claim 14, wherein said free space region is of a perforation of a motion picture film.

\* \* \* \* \*